United States Patent
Fried et al.

(10) Patent No.: US 9,219,621 B2
(45) Date of Patent: Dec. 22, 2015

(54) DYNAMIC RATE HEARTBEATING FOR INTER-NODE STATUS UPDATING

(75) Inventors: Eric P. Fried, Austin, TX (US); Lance W. Russell, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 322 days.

(21) Appl. No.: 13/425,666

(22) Filed: Mar. 21, 2012

(65) Prior Publication Data

US 2012/0203898 A1    Aug. 9, 2012

Related U.S. Application Data

(63) Continuation of application No. 12/959,568, filed on Dec. 3, 2010, now Pat. No. 8,667,126.

(51) Int. Cl.
   G06F 15/173    (2006.01)
   H04L 12/64     (2006.01)

(52) U.S. Cl.
   CPC ................... H04L 12/6418 (2013.01)

(58) Field of Classification Search
   USPC ......................................................... 709/224
   See application file for complete search history.

(56) References Cited

U.S. PATENT DOCUMENTS

| | | |
|---|---|---|
| 6,031,817 A | 2/2000 | Moy |
| 6,038,563 A | 3/2000 | Bapat et al. |
| 6,064,656 A | 5/2000 | Angal et al. |
| 6,185,613 B1 | 2/2001 | Lawson et al. |
| 6,411,967 B1* | 6/2002 | Van Renesse ............ 707/625 |
| 6,591,317 B1 | 7/2003 | Schzukin et al. |
| 6,631,363 B1 | 10/2003 | Brown et al. |
| 6,778,504 B2 | 8/2004 | Santry et al. |
| 6,862,619 B1 | 3/2005 | Sugauchi et al. |
| 6,983,324 B1* | 1/2006 | Block et al. ............... 709/228 |
| 7,058,957 B1 | 6/2006 | Nguyen |
| 7,451,359 B1 | 11/2008 | Coekaerts |
| 7,539,755 B2 | 5/2009 | Li et al. |

(Continued)

OTHER PUBLICATIONS

Van Renesse, et al., "A gossip-style failure detection service", Proceedings of the IFIP International Conference on Distributed Systems Platforms and Open Distributed Processing, 2009, Springer Verlag, Illinois.

(Continued)

*Primary Examiner* — Thanh Tammy Nguyen
*Assistant Examiner* — Natisha Cox
(74) *Attorney, Agent, or Firm* — Mitch Harris, Atty at Law, LLC; Andrew M. Harris; Parashos T. Kalaitzis

(57) ABSTRACT

A scheme for monitoring node operational status according to communications transmits messages periodically according to a heartbeat rate among the nodes. The messages may be gossip messages containing the status of the other nodes in the pairs, are received at the nodes and indications of the communications delays of the received messages are stored, which are used to compute statistics of the stored communications delays. Parameters of the node status monitoring, which are used for determining operational status of the nodes, are adjusted according to the statistics, which may include adjusting the heartbeat rate, the maximum wait time before a message is considered missed, and/or the maximum number of missed messages, e.g., the sequence number deviation, before the node is considered non-operational (down).

12 Claims, 4 Drawing Sheets

(56) References Cited

U.S. PATENT DOCUMENTS

| | | | |
|---|---|---|---|
| 7,542,437 B1 | 6/2009 | Redi et al. | |
| 7,571,230 B2 | 8/2009 | Gissel et al. | |
| 7,590,898 B2 | 9/2009 | Coekaerts | |
| 7,624,194 B2 | 11/2009 | Kakivaya et al. | |
| 7,650,404 B2 | 1/2010 | Parupudi et al. | |
| 7,664,125 B1 | 2/2010 | Bauer et al. | |
| 7,738,364 B2 | 6/2010 | Bain | |
| 7,856,480 B2 | 12/2010 | Muchow | |
| 7,913,105 B1 | 3/2011 | Ganesh et al. | |
| 8,108,715 B1 | 1/2012 | Agarwal | |
| 8,161,053 B1 | 4/2012 | Khan et al. | |
| 8,384,549 B2 | 2/2013 | Lemmon | |
| 8,433,760 B2 | 4/2013 | Ganapathy et al. | |
| 8,484,472 B2 | 7/2013 | Sherkin et al. | |
| 8,634,330 B2 | 1/2014 | Ganapathy et al. | |
| 2002/0178275 A1 | 11/2002 | Hein et al. | |
| 2003/0061340 A1* | 3/2003 | Sun et al. | 709/224 |
| 2003/0088831 A1 | 5/2003 | Bauer et al. | |
| 2003/0093516 A1 | 5/2003 | Parsons et al. | |
| 2003/0105801 A1 | 6/2003 | Tse et al. | |
| 2003/0225840 A1 | 12/2003 | Glassco et al. | |
| 2003/0233594 A1 | 12/2003 | Earl | |
| 2004/0008727 A1 | 1/2004 | See et al. | |
| 2004/0030775 A1 | 2/2004 | Lauzon et al. | |
| 2004/0064835 A1 | 4/2004 | Bellwood et al. | |
| 2004/0172467 A1 | 9/2004 | Wechter et al. | |
| 2005/0050098 A1 | 3/2005 | Barnett | |
| 2005/0065953 A1 | 3/2005 | Bower et al. | |
| 2005/0076145 A1 | 4/2005 | Ben-Zvi et al. | |
| 2005/0152396 A1 | 7/2005 | Pichna et al. | |
| 2005/0210128 A1* | 9/2005 | Cannon et al. | 709/224 |
| 2005/0234929 A1 | 10/2005 | Ionescu et al. | |
| 2006/0031282 A1 | 2/2006 | Tuttle et al. | |
| 2006/0050629 A1 | 3/2006 | Saika | |
| 2006/0242155 A1* | 10/2006 | Moore et al. | 707/10 |
| 2007/0041328 A1 | 2/2007 | Bell, IV | |
| 2007/0140243 A1 | 6/2007 | Eastham | |
| 2007/0226182 A1 | 9/2007 | Sobotka et al. | |
| 2007/0271276 A1* | 11/2007 | Allen et al. | 707/10 |
| 2007/0282959 A1 | 12/2007 | Stern | |
| 2008/0008106 A1 | 1/2008 | Boberg et al. | |
| 2008/0077635 A1 | 3/2008 | Sporny et al. | |
| 2008/0097628 A1* | 4/2008 | Weatherhead et al. | 700/54 |
| 2008/0183857 A1 | 7/2008 | Barfield et al. | |
| 2008/0317050 A1 | 12/2008 | Xiong et al. | |
| 2009/0043887 A1* | 2/2009 | Coekaerts | 709/224 |
| 2009/0070617 A1 | 3/2009 | Arimilli | |
| 2009/0138808 A1 | 5/2009 | Moromisato et al. | |
| 2009/0199051 A1 | 8/2009 | Jann et al. | |
| 2010/0077310 A1 | 3/2010 | Karachale et al. | |
| 2010/0094922 A1 | 4/2010 | Sathish | |
| 2010/0099447 A1 | 4/2010 | Boberg et al. | |
| 2010/0113072 A1 | 5/2010 | Gibson et al. | |
| 2010/0153528 A1 | 6/2010 | Pearson et al. | |
| 2010/0223492 A1 | 9/2010 | Farrugia et al. | |
| 2010/0274885 A1 | 10/2010 | Yoo et al. | |
| 2010/0281304 A1 | 11/2010 | Moyer et al. | |
| 2010/0290469 A1 | 11/2010 | Assarpour | |
| 2010/0332277 A1 | 12/2010 | Dentzer et al. | |
| 2011/0035462 A1 | 2/2011 | Akella | |
| 2011/0041140 A1 | 2/2011 | Harm et al. | |
| 2011/0093743 A1 | 4/2011 | Arcese et al. | |
| 2011/0145639 A1 | 6/2011 | Farahmand et al. | |
| 2011/0202500 A1 | 8/2011 | Warn et al. | |
| 2011/0246460 A1* | 10/2011 | Hsieh et al. | 707/736 |
| 2011/0274053 A1 | 11/2011 | Baik et al. | |
| 2012/0036250 A1 | 2/2012 | Vaswani et al. | |
| 2012/0047257 A1 | 2/2012 | Hauser | |
| 2012/0144018 A1 | 6/2012 | Fried et al. | |
| 2012/0203897 A1 | 8/2012 | Mishra et al. | |
| 2012/0203899 A1 | 8/2012 | Ganapathy et al. | |
| 2013/0042001 A1 | 2/2013 | Gould et al. | |

OTHER PUBLICATIONS

Office Action in U.S. Appl. No. 12/959,568 mailed on Nov. 27, 2012, 17 pages (pp. 1-17 in pdf).

Notice of Allowance in U.S. Appl. No. 12/959,568 mailed on Oct. 17, 2013, 11 pages (pp. 1-11 in pdf).

Office Action in U.S. Appl. No. 12/959,568 mailed on Jun. 10, 2013, 15 pages (pp. 1-15 in pdf).

\* cited by examiner

DYNAMIC RATE HEARTBEATING FOR INTER-NODE STATUS UPDATING

The present Application is a Continuation of U.S. patent application Ser. No. 12/959,568, filed on Dec. 3, 2010 and claims priority thereto under 35 U.S.C. §120. The disclosure of the above-referenced parent U.S. Patent Application is incorporated herein by reference.

CROSS-REFERENCE TO RELATED APPLICATIONS

The present U.S. Patent Application is related to co-pending U.S. patent applications Ser. No. 12/959,581 entitled " INTER-NODE COMMUNICATION SCHEME FOR NODE STATUS SHARING" and Ser. No. 12/959,556 entitled "ENDPOINT-TO-ENDPOINT COMMUNICATIONS STATUS MONITORING " filed contemporaneously herewith and having at least one common inventor and assigned to the same Assignee, the disclosures of which are incorporated herein by reference.

BACKGROUND

1. Field of the Invention

The present invention is related to node status monitoring in distributed computing systems, and more specifically to a scheme of dynamically controlling heartbeat rate and node status thresholds.

2. Description of Related Art

In large-scale distributed computer systems, such as those using distributed software models to perform tasks, multiple nodes provide independent execution of sub-tasks. In order to keep such a system operational, and further, to provide for proper operation of distributed applications that use the multiple nodes to perform various tasks, the status of nodes is tracked.

In particular, in order to assign tasks to nodes, and in order to ensure that a node is available to communicate with to perform a task, the operational status of the nodes and their ability to communicate with the other nodes must be monitored.

Communications and status monitoring may be performed according to a heartbeat-driven messaging scheme. Heartbeat messages are typically sent from the nodes to a centralized manager that maintains a record of the status of each node. The heartbeat rate and parameters for determining whether nodes and their connections are operational is typically fixed, so that uniformity in determining node status can be presumed.

BRIEF SUMMARY

The invention provides a node status monitoring method that collects information about transmission delays for communications between the nodes, and determines statistics used to adjust heartbeat rate and/or node status thresholds.

The method receives messages transmitted periodically among the nodes according to a heartbeat rate, which may be gossip messages transmit between all of the node pairs in the cluster. Indications of the communications delays of the received messages are stored and are used to compute statistics of a sliding window of the stored communications delays. Parameters of the node status monitoring, which are used for determining operational status of the nodes, are adjusted according to the statistics, which may include adjusting the heartbeat rate, the maximum wait time before a message is considered missed, and/or the maximum number of missed messages, e.g., the sequence number deviation, before the node is considered non-operational (down).

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for monitoring communication status in clusters of nodes within distributed computing systems. In particular, embodiments of the invention provide mechanisms for determining the operational status of the nodes in the cluster by monitoring communications delays and missed communications between the nodes. Messages, which may be gossip messages transmitted between each of the node pairs in a cluster as described in the above-incorporated U.S. Patent application "INTER-NODE COMMUNICATION SCHEME FOR NODE STATUS SHARING", are transmitted at a regular heartbeat rate. The receipt of the messages is timed, and an indication of the communications delay from the other nodes is stored, as well as the sequence number of the most recent message from each node. The mean of the communications delay and the average deviation or other indication of a typical deviation value are updated from the measured delay and are used to adjust parameters of the monitoring scheme, which may include the heartbeat rate, the communications delay threshold that is used to determine when a message from another node has been missed, and/or a maximum number of missed messages allowed before a node is considered non-operational (dead). Therefore, the status monitoring scheme of the present invention adapts parameters to the present network and processing loads, without requiring manual adjustments by administrators.

Figure 1:
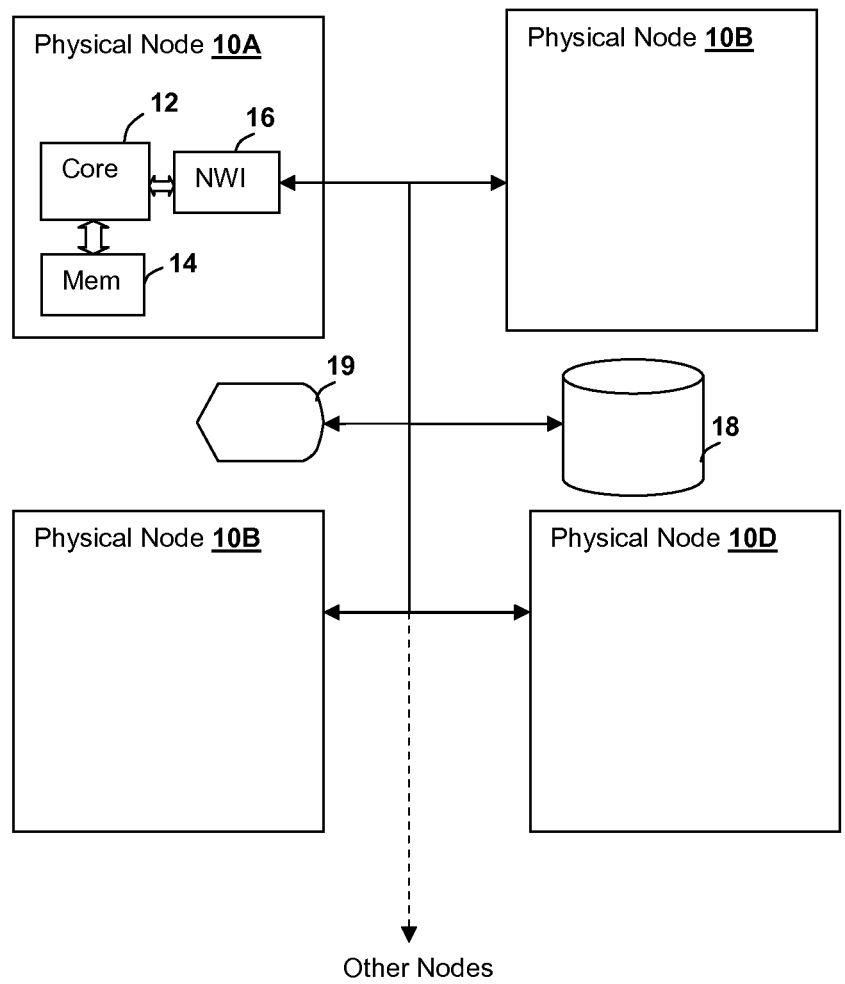
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide node status monitoring for either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
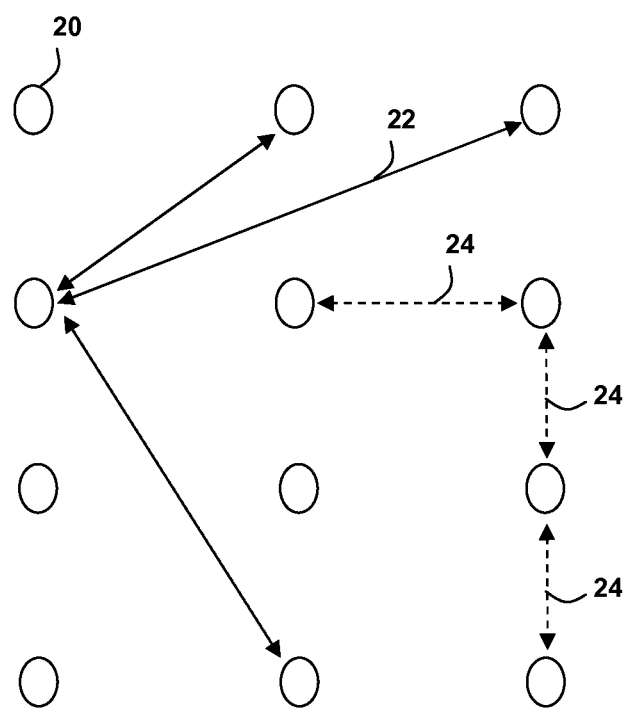
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns node status monitoring and communications of node status among nodes within the computer system of FIG. 1.

In the exemplary embodiment, as described in the above-incorporated U.S. Patent Application "INTER-NODE COMMUNICATION SCHEME FOR NODE STATUS SHARING", gossip messages and other node status command messages are communicated between nodes 20 and the messages are processed at each node. While the exemplary embodiment uses the same gossip messages described in the above-incorporated U.S. Patent Application, the sharing of status information is not required to practice the present invention, as the statistical analysis and parameter tuning disclosed herein can be applied in node status monitoring schemes that use other types of messages having a predictable pattern, such as centrally broadcast heartbeat pings containing no additional status information. In the present embodiment, operational messages are also passed between nodes 20, including data and program code transmissions. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. While the description of the particular embodiments of the invention below describes the node status and gossip communications taking place node-to-node as opposed to from nodes to a centralized status facility, it is understood that node-to-node communications do not require that the transmissions take place over a physical network that does not traverse other nodes, and the next-neighbor communications 24 can be used to implement node-to-node communications. Further, as alternative to the illustrated communications is to use a central facility for inter-node communication, which is distinct from centrally reporting and acting on node status indications. Therefore, the present invention may encompass techniques that use a centralized communication point, such as a star arrangement, while still passing gossip messages in a node-to-node manner with respect to the messaging endpoints. However, since the illustrated embodiment provides a de-centralized communications monitoring system, it is generally preferable not to use a central exchange for messaging.

Figure 3:
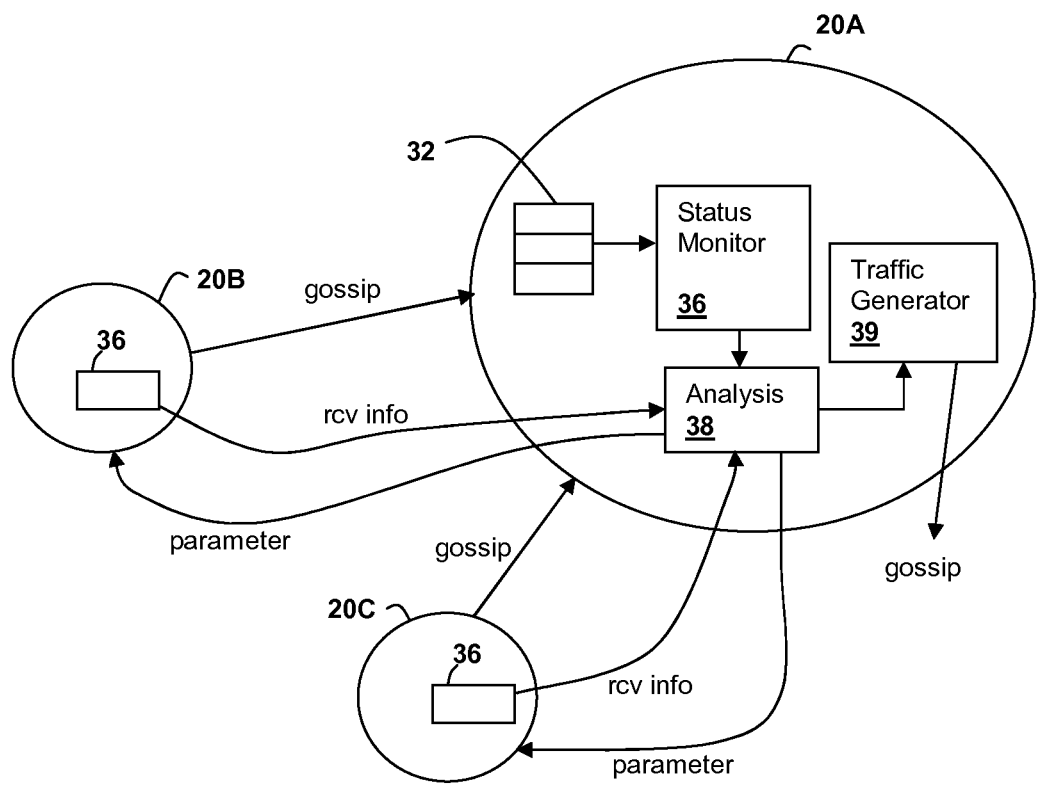
FIG. 3 is a pictorial diagram showing features of a node status monitoring scheme in accordance with an embodiment of the present invention.

Referring now to FIG. 3, a node status monitoring scheme in accordance with an embodiment of the invention is illustrated. Nodes 20A-20C each send gossip messages to all other nodes in the cluster and include a status monitor 36 that determines whether a gossip message from another node has not been received within a predetermined period, i.e. a maximum communications delay threshold value. The data provided to the status monitor is stored in a table 32 or other database as the messages are received, details of which are described in the above-referenced U.S. Patent Application "GOSSIPING SCHEME FOR NODE STATUS SHARING." Status monitors 36 in each of the nodes send message reception information, which may be aggregated as individual statistics at each of the nodes, to a central analysis block 38, which computes statistics such as the mean and average deviation of the communications delay values over the node cluster and computes parameters such as the heartbeat rate, the maximum communications delay threshold and the maximum missed packet count from the statistics. The parameters are sent to the other nodes 20B-20C, in the illustration, to tune the heartbeat rate used by traffic generator 39 in each of the nodes, and/or to set the thresholds used to decide whether to mark a node as up or down when messages are not received from that node.

In the exemplary embodiment, the mean round-trip communications time estimate (MRT) is computed according to:

$$MRT(t)=0.875*MRT(t-\Delta t)+0.125*T_{MEAS}$$

where $\Delta t$ is the measurement interval and $T_{MEAS}$ is the most-recently measured round-trip communications time. The sample size in the exemplary embodiment is 1000, and the default values of communications thresholds are pre-biased to high values and then change to lower values as sample data is accumulated. The communications error is computed according to:

$$ERR=|MRT|-T_{MEAS}$$

and the mean deviation D is:

$$D(t)=0.125*D(t-\Delta t)+0.875*ERR$$

The statistics are continuously updated according to the above formulas and are used to set the maximum number of missed messages allowed until a node is marked as down. If, for example, a node is generating messages every 100 ms, the average communications time is 70 ms and the average variation is 30 ms attributed to network traffic, communications errors and other overhead, then as the time increases without receiving a next packet from the node, the probability that the missed communication was caused by normal fluctuations decreases and the probability that the node is down increases. If, for example, at t=200 ms, the communications is not received, there is a high probability (approximately 0.99) that the missed packet is due to the node being down and not due to normal communications variation, and so the other nodes are polled to determine if they have indications that the node is alive. If the other nodes do not have indications that the node is alive, then at t=800 ms, for example, the node can be presumed dead.

Figure 4:
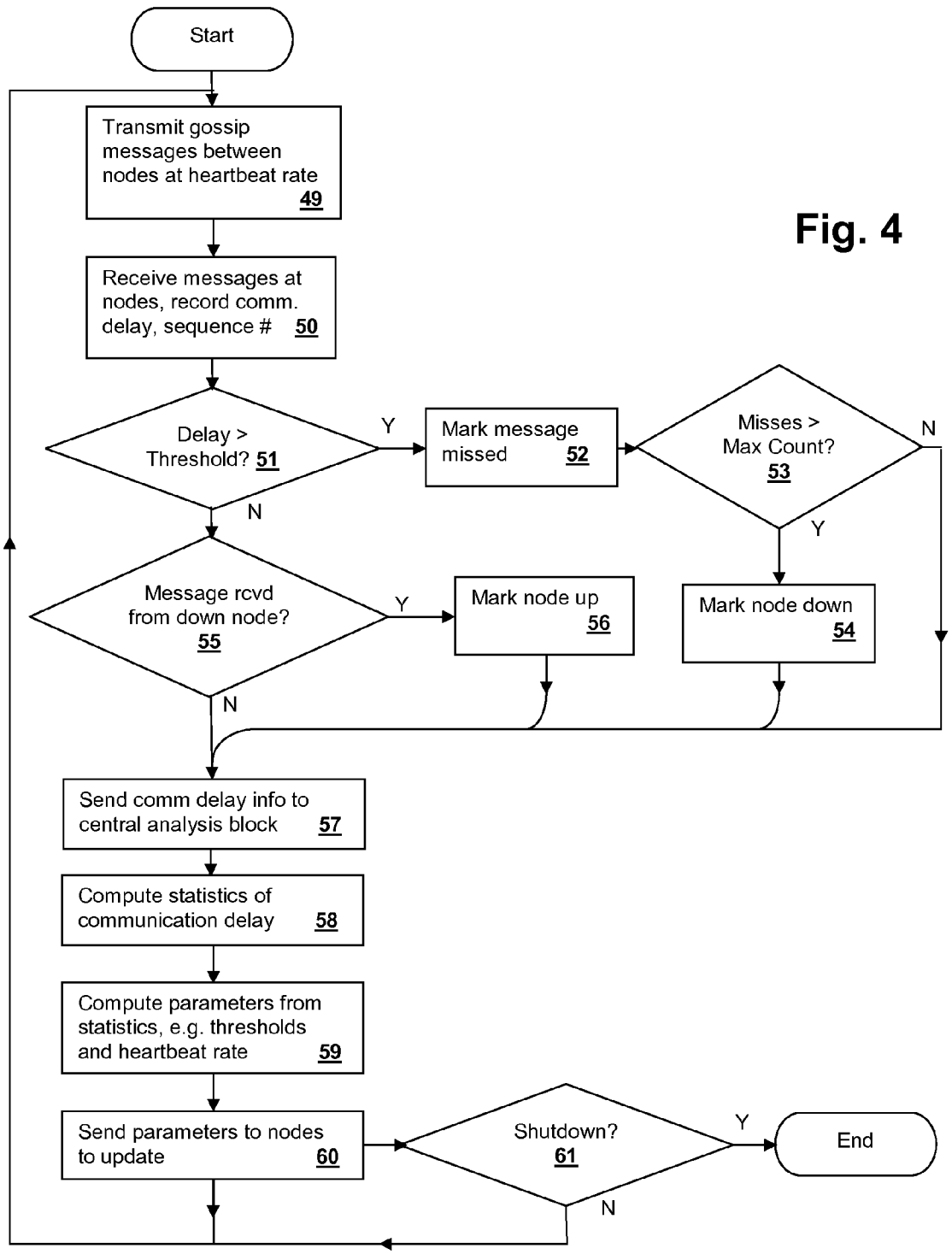
FIG. 4 is a flowchart of a method in accordance with an embodiment of the present invention.

Referring now to FIG. 4, a node status monitoring method in accordance with an embodiment of the present invention is illustrated. Gossip messages are transmitted between node pairs in the cluster (step 49). The messages are received at the nodes and the communications delay and message sequence number are recorded (step 50), and in the particular embodiment other information such as the status of the other nodes obtained from the gossip messages. If a message communications delay is greater than the maximum delay threshold, i.e., a message is not received after a predetermined time period (decision 51), the message is marked as missed (step 52). If the missed sequence numbers for the missing message has exceeded a maximum count of missed messages (step 53), the node from which the expected gossip message was not received is marked as down (step 54). Otherwise, if the communications delay is less than or equal to the maximum delay threshold (decision 51) if the message is received from a node that is marked as down (decision 55), then the node is marked as up (step 56). After the node status processing is complete, the collected communications information is sent to the data analysis block (step 57) and the statistics of the communications delay are determined (step 58). The node status monitoring parameters are determined from the statistics, e.g., the heartbeat rate, maximum delay threshold and maximum missed message count (step 59) and the computed parameters are sent to the nodes (step 60). The process of steps 49-60 is repeated until the system is shutdown or the scheme is otherwise terminated (decision 61).

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

While the invention has been particularly shown and described with reference to the preferred embodiments thereof, it will be understood by those skilled in the art that the foregoing and other changes in form and details may be made therein without departing from the spirit and scope of the invention. time before a message is considered missed, and/or the maximum number of missed messages, e.g., the sequence number deviation, before the node is considered non-operational (down).

What is claimed is:

1. A method for determining node operating status among a cluster of nodes of a computer system, the method comprising:

transmitting gossip messages directly between pairs of nodes of the cluster, the gossip messages containing an indication of operational status of nodes of the cluster other than the nodes corresponding to the pair of nodes between which the gossip message is communicated, wherein the transmitting is performed periodically according to a heartbeat rate;

receiving the gossip messages at a receiving one of the corresponding pair of nodes and storing indications of communications delays for the gossip messages;

computing statistics of the communications delay for the gossip messages, wherein the computing computes a mean and mean deviation of the communications delays, and wherein the mean of the communications delay is a mean round-trip communications time (MRT) computed according to the formula $MRT(t)=0.875*MRT(t-\Delta t)+0.125*T_{MEAS}$, where $\Delta t$ is a period corresponding to the heartbeat rate and $T_{MEAS}$ is the most-recently measured round-trip communications time, and wherein the mean deviation of the communications delay D is computed according to $D(t)=0.125*D(t-\Delta t)+0.875*ERR$, where $ERR=|MRT|-T_{MEAS}$;

adjusting parameters for node status monitoring according to the computed statistics, wherein the adjusting parameters of the node status monitoring comprises adjusting a threshold maximum number of missed receptions of the receiving used to determine whether a node is operational according to the mean round-trip communications time and the mean deviation of the communications delay; and monitoring the operational status of the nodes according to the indications of communications delay, the parameters, and the operational status of the other nodes in the cluster as communicated by the gossip messages.

2. The method of claim 1, wherein the adjusting parameters of the node status monitoring comprises adjusting a rate of the transmitting in conformity with the computed statistics.

3. The method of claim 1, wherein the adjusting parameters of the node status monitoring comprises adjusting a maximum wait time used to determine whether a node is operational when one or more of the gossip messages transmitted by the transmitting has not been received.

4. The method of claim 1, wherein the adjusting parameters of the node status monitoring comprises adjusting a maximum number of missed receptions of the receiving used to determine whether a node is operational.

5. A computer system comprising a processing cluster including a plurality of physical or virtual processing nodes, the computer system comprising at least one processor for executing program instructions and at least one memory coupled to the processor for executing the program instructions, wherein the program instructions are program instructions for determining node operating status among a cluster of the physical or virtual processing nodes, the program instructions comprising program instructions for:
    transmitting gossip messages directly between pairs of nodes of the cluster, the gossip messages containing an indication of operational status of nodes of the cluster other than the nodes corresponding to the pair of nodes between which the gossip message is communicated, wherein the transmitting is performed periodically according to a heartbeat rate;
    receiving the gossip messages at a receiving one of the corresponding pair of nodes and storing indications of communications delays for the messages;
    computing statistics of the communications delay for the gossip messages, wherein the program instructions for computing compute a mean and mean deviation of the communications delays, and wherein the program instruction for computing compute the mean of the communications delay as a mean round-trip communications time (MRT) according to the formula $MRT(t)=0.875*MRT(t-\Delta t)+0.125*T_{MEAS}$, where $\Delta t$ is a period corresponding to the heartbeat rate and $T_{MEAS}$ is the most-recently measured round-trip communications time, and compute the mean deviation of the communications delay D according to $D(t)=0.125*D(t-\Delta t)+0.875*ERR$, where $ERR=|MRT|-T_{MEAS}$;
    adjusting parameters for node status monitoring according to the computed statistics, wherein the program instructions for adjusting the parameters of the node status monitoring adjust a threshold maximum number of missed receptions of the receiving used to determine whether a node is operational according to the mean round-trip communications time and the mean deviation of the communications delay; and
    monitoring the operational status of the nodes according to the indications of communications delay, the parameters, and the operational status of the other nodes in the cluster as communicated by the gossip messages.

6. The computer system of claim 5, wherein the program instructions for adjusting parameters of the node status monitoring adjust a rate of the transmitting in conformity with the computed statistics.

7. The computer system of claim 5, wherein the program instructions for adjusting parameters of the node status monitoring adjust a maximum wait time used to determine whether a node is operational when one or more of the gossip messages transmitted by the transmitting has not been received.

8. The computer system of claim 5, wherein the program instructions for adjusting parameters of the node status monitoring adjust a maximum number of missed receptions of the receiving used to determine whether a node is operational.

9. A computer program product comprising a computer-readable storage device storing program instructions for execution within a computer system, the computer system comprising a processing cluster including a plurality of physical or virtual processing modes, wherein the program instructions are program instructions for determining node operating status among a cluster of the physical or virtual processing nodes, the program instructions comprising program instructions for:
    transmitting gossip messages directly between pairs of nodes of the cluster, the gossip messages containing an indication of operational status of nodes of the cluster other than the nodes corresponding to the pair of nodes between which the gossip message is communicated, wherein the transmitting is performed periodically according to a heartbeat rate;
    receiving the gossip messages at a receiving one of the corresponding pair of nodes and storing indications of communications delays for the messages;
    computing statistics of the communications delay for the gossip messages, wherein the program instructions for computing compute a mean and mean deviation variance of the communications delays, and wherein the program instruction for computing compute the mean of the communications delay as a mean round-trip communications time (MRT) according to the formula $MRT(t)=0.875*MRT(t-\Delta t)+0.125*T_{MEAS}$, where $\Delta t$ is a period corresponding to the heartbeat rate and $T_{MEAS}$ is the most-recently measured round-trip communications time, and compute the mean deviation of the communications delay D according to $D(t)=0.125*D(t-\Delta t)+0.875*ERR$, where $ERR=|MRT|-T_{MEAS}$;
    adjusting parameters for node status monitoring according to the computed statistics, wherein the program instructions for adjusting the parameters of the node status monitoring adjust a threshold maximum number of missed receptions of the receiving used to determine whether a node is operational according to the mean round-trip communications time and the mean deviation of the communications delay; and
    monitoring the operational status of the nodes according to the indications of communications delay, the parameters, and the operational status of the other nodes in the cluster as communicated by the gossip messages.

10. The computer program product of claim 9, wherein the program instructions for adjusting parameters of the node status monitoring adjust a rate of the transmitting in conformity with the computed statistics.

11. The computer program product of claim 9, wherein the program instructions for adjusting parameters of the node status monitoring adjust a maximum wait time used to determine whether a node is operational when one or more of the gossip messages transmitted by the transmitting has not been received.

12. The computer program product of claim 9, wherein the program instructions for adjusting parameters of the node status monitoring adjust a maximum number of missed receptions of the receiving used to determine whether a node is operational.

* * * * *